United States Patent

Maruyama

[11] Patent Number: 6,128,266
[45] Date of Patent: Oct. 3, 2000

[54] DC OFFSET REMOVING CIRCUIT FOR MAGNETO-OPTICAL RECORDING MEDIUM

[75] Inventor: Youhei Maruyama, Tanoyu, Japan

[73] Assignee: Texas Instruments Incorporated, Dallas, Tex.

[21] Appl. No.: 09/028,259

[22] Filed: Feb. 23, 1998

[51] Int. Cl.[7] ........................................................ G11B 7/00
[52] U.S. Cl. ................................ 369/124; 369/59; 369/32
[58] Field of Search ..................................... 369/112, 124, 369/48, 59, 13, 32; 360/51, 78.14, 78.04; 341/122, 162

[56] References Cited

U.S. PATENT DOCUMENTS

| | | | |
|---|---|---|---|
| 5,684,772 | 11/1997 | Yamagami et al. | 369/59 |
| 5,831,562 | 11/1998 | Van Auken et al. | 341/122 |
| 5,838,512 | 11/1998 | Okazaki | 360/51 |

*Primary Examiner*—Ali Neyzari
*Assistant Examiner*—Kim-Kwok Chu
*Attorney, Agent, or Firm*—Bret J. Petersen; Frederick J. Telecky, Jr.

[57] ABSTRACT

The objective of the invention is to provide a type of offset elimination circuit that can reliably remove the ripple error. The offset elimination circuit comprises the following circuits: comparator 11 which generates square-wave data signal S11 corresponding to the rising and falling edges of the differential signal from the reproduction differential signal; shift registers 17–19 which latch gate signal GT activated only during processing of the aforementioned VFO region in synchronization with the aforementioned square-wave data signal, and sequentially shift the aforementioned gate signal in synchronization with said square-wave data signal S11; charge pump circuit 12 which receives first gate signal S17 latched by the aforementioned shift registers and generates sawtooth data signal S12 corresponding to the level of square-wave data signal S11 output from said comparator 11; sample-and-hold circuit 13 which receives second gate signal S18 shifted to the rear section with respect to first gate signal S17 of the aforementioned shift register and performs the hold operation for output signal S12 of said charge pump circuit 12; and adder 16 which adds the output signal of the aforementioned sample-and-hold circuit to the aforementioned reproduced differential signal.

4 Claims, 2 Drawing Sheets

DC OFFSET REMOVING CIRCUIT FOR MAGNETO-OPTICAL RECORDING MEDIUM

FIELD OF THE INVENTION

The present invention pertains to a type of offset elimination circuit for use in magnetooptical recording devices, etc.

BACKGROUND OF THE INVENTION

In magnetooptical disk [devices], a laser beam is irradiated on the magnetooptical disk, and the reflected light is used to reproduce the data. However, the reproduced differential signal contains variations in the reflectivity of the disk and variations in the low-frequency component caused by out-of-focus conditions, etc. These variations result in DC offset. Consequently, an offset elimination circuit is set to remove the offset.

In the magnetooptical disk device, the format of the data track is shown in FIG. 3. It can be seen that Variable Frequency Oscillation (VFO) region 2, the region that contains only sinusoidal wave (clock signal), is arranged ahead of data region 1.

Said VFO region 2 has a continuous repeated data pattern (sinusoidal wave) for reliable reproduction of the data, even in the case of variation in rotation of the disk. It is the data pattern that generates the clock for reading the data as the PLL (phase-locked loop) circuit is locked to this pattern because there is also a variation in the pattern of VFO when there is variation in rotation of the disk.

During reproduction, when the VFO region has DC offset, the duty ratio, that is, the ratio of "1" to "0" in each period of the pulse, cannot become 50% for the detection pulses, and it is impossible to obtain good reproduction data.

The offset elimination circuit of the magnetooptical recording device has a constitution in which the offset of the differential data is absorbed in the so-called VFO region.

FIG. 4 is a circuit diagram illustrating an example of the constitution of the offset elimination circuit that removes the DC offset of the reproduction differential signal.

As shown in FIG. 4, this offset elimination circuit 10 comprises comparator (COMP) 11, charge pump circuit (C/P) 12, sample-and-hold circuit (S/H) 13, capacitors 14, 15 and adder 16.

In said offset elimination circuit 10, light is irradiated on a magnetic disk [sic; magnetooptical disk], and reproduction is performed from the reflected light; as shown in FIG. 5(a), signal S13 is added by adder 16 to obtained reproduction differential signal DDT in the VFO region, and DDT is then input as a sinusoidal wave to comparator 11.

By means of comparator 11, as shown in FIG. 5(b), the input differential DDT generates square-wave data signal S11, which is output to charge pump circuit 12.

By means of charge pump circuit 12, sawtooth data signal S12 is generated and output to sample-and-hold circuit 13. For the sawtooth data signal, the waveform rises during the period from the rising edge to the falling edge of square-wave data signal S11 and it falls during the period from the falling edge to the rising edge of square-wave data signal S11.

By means of sample-and-hold circuit 13 and capacitor 15, in synchronization with gate signal GT set in the active state only in the processing period of the VFO region, the sample operation and hold operation are performed repeatedly with respect to output signal S12 of charge pump circuit 12, and the obtained signal is output as signal S13. Said signal S13 is added to reproduction differential signal DDT by adder 16, and said differential signal DDT is input to comparator 11.

In this way, a feedback circuit is formed, and, in charge pump circuit 12, feedback control is performed such that the duty ratio becomes 50%, that is, the offset becomes 0.

In said offset elimination circuit 10, the data is held (maintained) corresponding to gate signal GT by sample-and-hold circuit 13. However, as the gate timing is asynchronous to the data, a maximum ripple error takes place.

In order to solve this problem, it has been proposed that the current be reduced in order to decrease the ripple. However, in this case, the convergence time becomes longer, which is contradictory to the requirement for faster speed.

The purpose of the present invention is to solve the aforementioned problems of the conventional technology by providing a type of offset elimination circuit which can reliably remove the ripple error with a simple circuit.

SUMMARY OF THE INVENTION

In order to realize the aforementioned purpose, the present invention provides a type of offset elimination circuit characterized by the following facts: the offset elimination circuit is for removing the DC offset in the VFO region made up of the sinusoidal wave of the differential signal reproduced from the magnetooptical recording medium; this offset elimination circuit comprises the following circuits: a comparator which generates a square-wave data signal corresponding to the rising and falling edges of the differential signal from the aforementioned differential signal; a shift register which latches the gate signal activated only during processing of the aforementioned VFO region in synchronization with the aforementioned square-wave data signal, and shifts the aforementioned gate signal in synchronization with the aforementioned square-wave data signal; a charge pump circuit which receives the first gate signal latched by the aforementioned shift register and generates a sawtooth data signal corresponding to the level of the square-wave data signal output from the aforementioned comparator; a sample-and-hold circuit which receives the second gate signal shifted to the rear section with respect to the first gate signal of the aforementioned shift register and performs the hold operation for the output signal of the aforementioned charge pump circuit; and an adder which adds the output signal of the aforementioned sample-and-hold circuit to the aforementioned reproduced differential signal.

The aforementioned shift register is preferably made up of a first D-type flip-flop circuit, which receives the gate signal fed to the data input terminal and the square-wave data signal fed from the aforementioned comparator to the clock input terminal and which outputs the aforementioned first gate signal from the data output terminal, and a second D-type flip-flop circuit, which receives the output signal from the data output terminal of the aforementioned first flip-flop circuit fed to the data input terminal and the inverted-phase signal of the square-wave data signal fed from the aforementioned comparator to the clock input terminal, and which outputs the aforementioned second gate signal from the aforementioned data output terminal.

By means of the offset elimination circuit of the present invention, it is possible to use the shift register to stop the hold operation at the midpoint of the ripple with the gate signal synchronized to the reproduction data.

In this way, it is possible to remove the ripple error.

As explained above, the present invention provides a type of offset elimination circuit that can remove the ripple error reliably by means of a simple circuit.

REFERENCE NUMERALS AND SYMBOLS AS SHOWN IN THE DRAWINGS

10a... offset elimination circuit, 11 ... Comparator, 12 ... Charge pump circuit (C/P), 13 ... Sample-and-hold circuit (S/H), 14, 15 ... Capacitors (14), (15), 16 ... Adder, 17, 18 ... D-type flip-flop circuit, 19 ... Inverter

DESCRIPTION OF EMBODIMENTS

Figure 1:
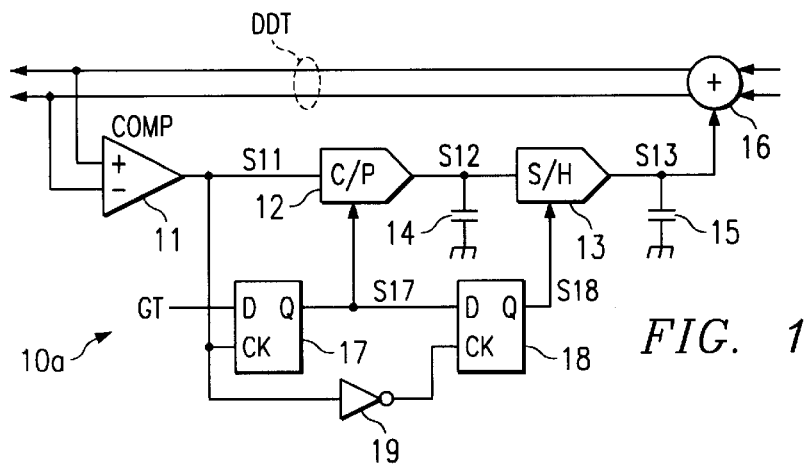
FIG. 1 is a block diagram illustrating an embodiment of the offset elimination circuit of the present invention.
Figure 4:
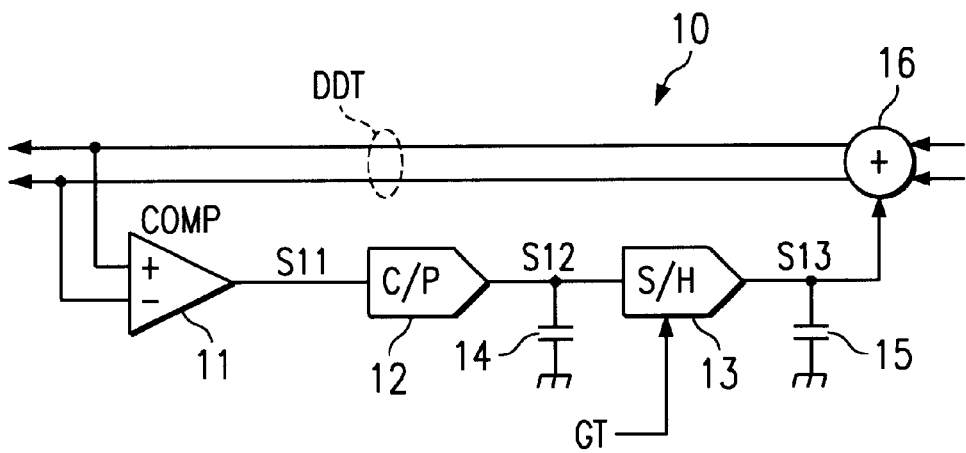
FIG. 4 is block diagram illustrating an example of the constitution of a conventional offset elimination circuit.

FIG. 1 is a block diagram illustrating an embodiment of the offset elimination circuit of the present invention. The same part numbers as used in FIG. 4 are adopted here.

As shown in FIG. 1, said offset elimination circuit 10a comprises comparator (COMP) 11, charge pump circuit (C/P) 12, sample-and-hold circuit (S/H) 13, capacitors 14, 15, adder 16, D-type flip-flop circuits 17, 18, and inverter 19.

D-input [terminal] of flip-flop circuit 17 is connected to the input line of gate signal GT; clock input [terminal] CK is connected to the output line of comparator 11; and the Q-output is connected to the control terminal of charge pump circuit 12 and D-input [terminal] of flip-flop circuit 18. Clock input [terminal] CK of flip-flop circuit 18 is connected to the output terminal of inverter 19, and the input terminal of inverter 19 is connected to the output line of comparator 11. Also, Q-output of flip-flop circuit 18 is connected to the control terminal of sample-and-hold circuit 13.

By means of offset removal circuit 10a, gate signal GT is synchronized to output square-wave data signal (up/down signal) S11 of comparator 11.

At the time of the rising edge of the data signal, that is, square-wave data signal S11, gate signal GT is retrieved and input into flip-flop circuit 17; then, at the time of the next rising edge of square-wave data signal S11, the gate signal is output as first gate signal S17, and, by means of said first gate signal S17, the current of charge pump circuit 12 is reduced by half. At time of the falling edge of the data signal, output signal S17 of flip-flop circuit 17 is retrieved and input into flip-flop circuit 18; then, at the time of the next falling edge, output signal S18 of flip-flop circuit 18 is sent as the second gate signal to sample-and-hold circuit 13.

That is, flip-flop circuits (17) and (18) form a 2-bit shift register.

Figure 2:
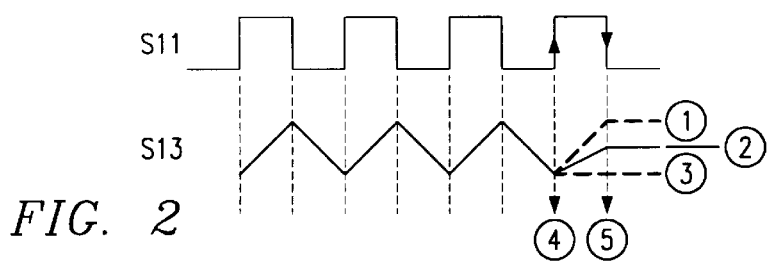
FIG. 2 is a diagram illustrating the operation of the main portion of the circuit shown in FIG. 1.
Figure 3:
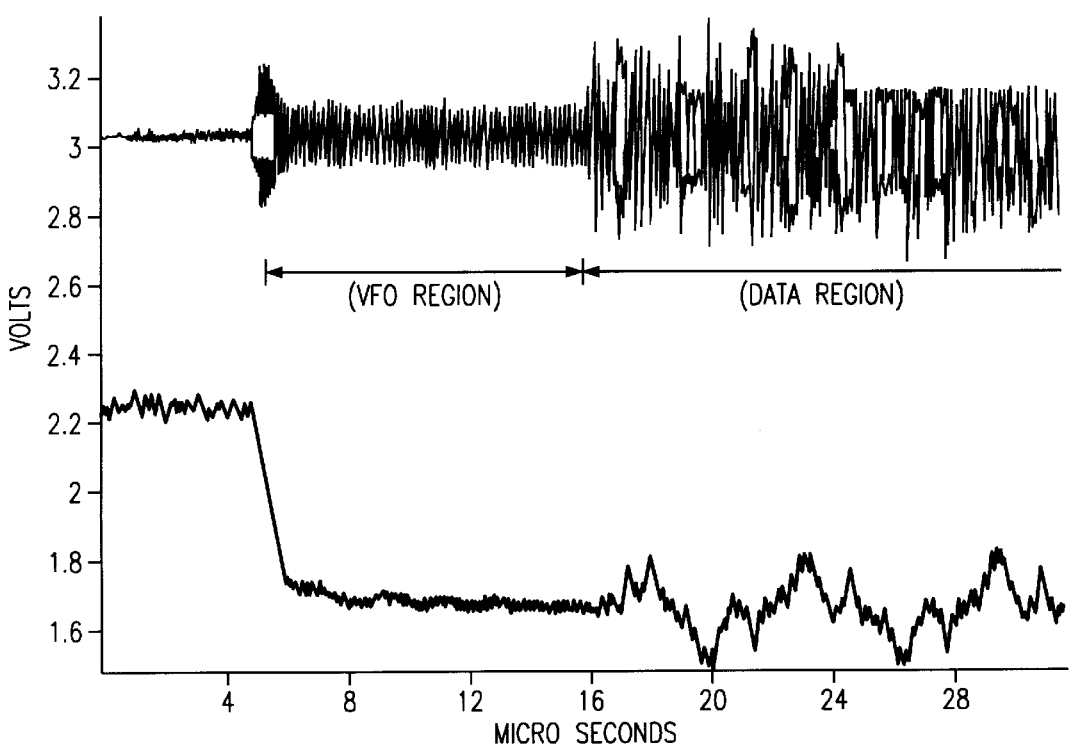
FIG. 3 is a diagram illustrating the VFO region and the data region.

FIG. 2 illustrates the relationship between output square-wave data signal S11 of comparator 11 and output signal S13 of sample-and-hold circuit 13.

In the following, the operation with the aforementioned constitution will be explained.

In said offset elimination circuit 10a, a laser beam is irradiated on a magnetic disk [sic; magnetooptical disk], and the reflected light is used for reproduction. By means of adder 16, signal S13 is added, and the obtained reproduction differential signal DDT of VFO region is input as a sinusoidal wave to comparator 11 as shown in FIG. 5(a).

Figure 5:
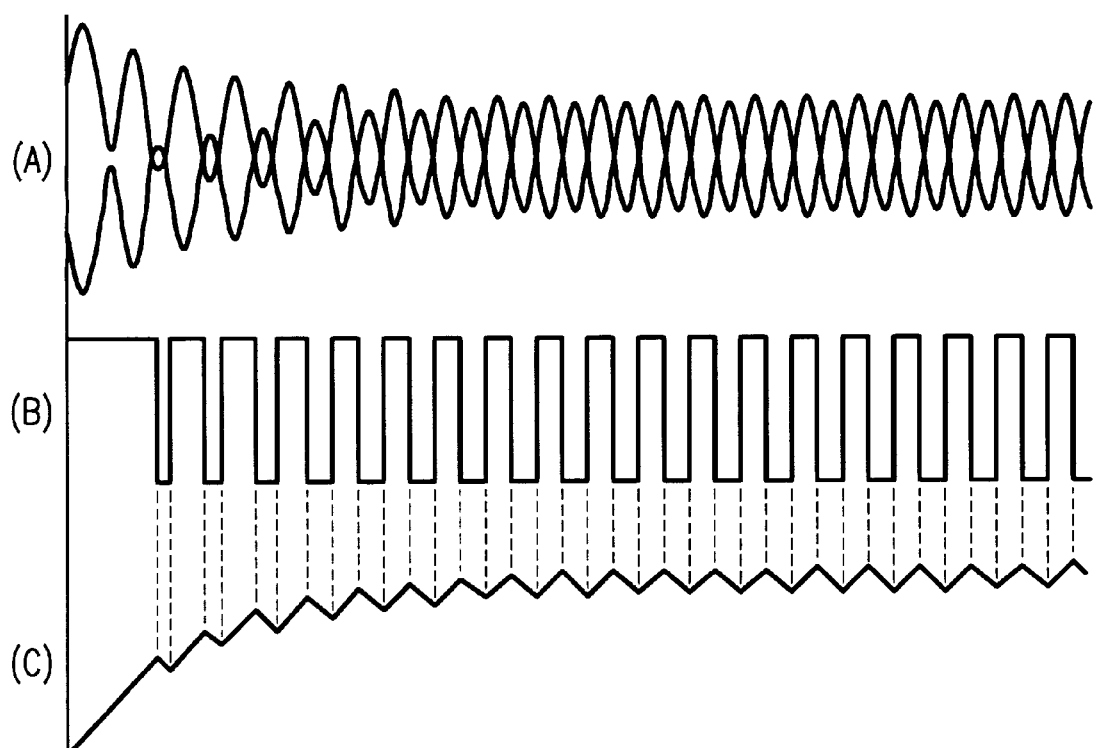
FIG. 5 is a diagram illustrating the general operation of an offset elimination circuit.

As shown in FIG. 5(b), by means of comparator 11, the input differential signal DDT forms square-wave data signal S11, which is output to charge pump circuit 12, clock input [terminal] CK of flip-flop circuit 17 and inverter 19.

Then, at the time of the rising edge of the data, that is, square-wave data signal S1, gate signal GT, which becomes active only in the VFO region, is retrieved and input into flip-flop circuit 17. At the time of the next rising edge of the data (square-wave data signal S11), signal S17 is output. By means of this signal S17, the current of charge pump circuit 12 is reduced by half.

By means of charge pump circuit 12, sawtooth data signal S12 is formed and output to sample-and-hold circuit 13. Said sawtooth data signal S12 rises during the period from the rising edge to the falling edge of square-wave data signal S11, and it falls during the period from the falling edge to the rising edge of square-wave data signal S11.

Then, square-wave data signal S11 is input through inverter 19 to clock input [terminal] CK of flip-flop circuit 18. At the time of the falling edge of the data [signal], output signal S17 of flip-flop circuit 17 is fetched into flip-flop circuit 18. Then, at the time of the next falling edge of the data [signal], output signal S18 is sent as a gate signal to sample-and-hold circuit 13.

By means of sample-and-hold circuit 13 and capacitor 15, the sampling operation and hold operation are performed repeatedly with respect to output signal S12 of charge pump circuit 12 in synchronization with gate signal GT set in the active state only during the processing period of VFO region. As signal S13, it is added to reproduction differential signal DDT by adder 16, and the obtained differential signal DDT is input to comparator 11.

In this way, a feedback circuit is formed, and, in charge pump circuit 12, feedback control is performed such that the duty ratio becomes 50%, that is, the offset becomes 0.

In the aforementioned operation, the current of charge pump circuit 12 is controlled to be reduced by half by flip-flop circuit 17. As shown in FIG. 2, at time ⑤, the midpoint ② between voltages ① and ③ is reached. At the time of the input of signal S18, the hold operation is performed in sample-and-hold circuit 13.

In this way, it is possible to stop the hold operation at the midpoint of the ripple, and the ripple error is removed.

As explained above, in this embodiment, the offset elimination circuit comprises the following circuits: comparator 11 which generates square-wave data signal S11 corresponding to the rising and falling edges of the differential signal from the reproduction differential signal; shift registers 17–19 which latch gate signal GT activated only during processing of the aforementioned VFO region in synchronization with the aforementioned square-wave data signal, and sequentially shift the aforementioned gate signal in synchronization with said square-wave data signal S11; charge pump circuit 12 which receives first gate signal S17 latched by the aforementioned shift registers and generates sawtooth data signal S12 corresponding to the level of square-wave data signal S11 output from said comparator 11; sample-and-hold circuit 13 which receives second gate signal S18 shifted to the rear section with respect to first gate signal S17 of the aforementioned shift register and performs the hold operation for output signal S12 of said charge pump circuit 12; and adder 16 which adds the output signal of the aforementioned sample-and-hold circuit to the aforementioned reproduced differential signal. Consequently, a simple circuit can be used to remove the ripple error reliably in said offset elimination circuit 10a.

What is claimed is: In the Specification:

1. An offset removing circuit for removing a DC offset of a Variable Frequency Oscillator region made of a sinusoidal wave of a differential signal reproduced from a magneto optical recording medium, comprising:

a comparator which generates a square-wave data signal from the differential signal corresponding to rising and falling edges of the differential signal;

a shift register which latches [the] an input gate signal activated only during processing of the VFO region in synchronization to the square-wave data signal, and shifts the input gate signal to output a first gate signal in synchronization with the square-wave data signal;

a charge pump circuit which receives the first gate signal latched by the shift register and generates a sawtooth data signal corresponding to a level of the square-wave data signal output from the comparator;

a sample-and-hold circuit which receives a second gate signal shifted with respect to the first gate signal of the shift register and performs a hold operation for the output signal of the charge pump circuit;

and an adder which adds the output signal of the sample-and-hold circuit to the reproduced differential signal.

2. The offset removing circuit described in claim 1 wherein the shift register comprises:

a first D-type flip-flop circuit, which receives the input gate signal fed to a data input terminal and the square-wave data signal fed from the comparator to a clock input terminal and which outputs the first gate signal from the data output terminal, and a second D-type flip-flop circuit, which receives the output signal from the data output terminal of the first flip-flop circuit fed to the data input terminal and an inverted-phase signal of the square-wave data signal fed from the comparator to the clock input terminal, and which outputs the second gate signal from the data output terminal.

3. The offset removing circuit described in claim 1 wherein the current of the charge pump is reduced by half when controlled by the first gate input.

4. The offset removing circuit described in claim 2 wherein the current of the charge pump is reduced by half when controlled by the first gate input.

* * * * *